United States Patent
Burke, Jr.

(10) Patent No.: US 8,593,676 B2
(45) Date of Patent: Nov. 26, 2013

(54) METHOD AND SYSTEM FOR MANAGING PRINT DEVICE INFORMATION USING A CLOUD ADMINISTRATION SYSTEM

(75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

(21) Appl. No.: 13/112,303

(22) Filed: May 20, 2011

(65) Prior Publication Data

US 2012/0293828 A1 Nov. 22, 2012

(51) Int. Cl.
*G06F 3/12* (2006.01)

(52) U.S. Cl.
USPC ......... 358/1.15; 358/1.13; 358/1.14; 715/771

(58) Field of Classification Search
USPC .................................. 358/1.14, 1.15
See application file for complete search history.

(56) References Cited

U.S. PATENT DOCUMENTS

| | | | |
|---|---|---|---|
| 5,305,199 A | 4/1994 | LoBiondo et al. | |
| 6,304,732 B1 | 10/2001 | Myers et al. | |
| 6,647,222 B1 | 11/2003 | Digby et al. | |
| 7,317,882 B2 | 1/2008 | Dombrowski | |
| 7,574,496 B2 | 8/2009 | McCrory et al. | |
| 7,587,146 B2 | 9/2009 | Horn | |
| 7,649,638 B2 | 1/2010 | Beard et al. | |
| 7,650,085 B2 | 1/2010 | Kehoe et al. | |
| 7,667,874 B2 | 2/2010 | MacDonald et al. | |
| 7,773,239 B2 | 8/2010 | Beard et al. | |
| 1,004,720 A1 | 2/2011 | Mansoor et al. | |
| 8,009,302 B2 | 8/2011 | Martin | |
| 8,139,238 B2 | 3/2012 | Oki | |
| 2010/0103445 A1 | 4/2010 | Levine et al. | |
| 2010/0296122 A1* | 11/2010 | Mitsui | 358/1.15 |
| 2010/0302573 A1* | 12/2010 | Hakozaki | 358/1.14 |
| 2010/0332629 A1 | 12/2010 | Cotugno et al. | |
| 2011/0292431 A1 | 12/2011 | Cok | |
| 2011/0292435 A1 | 12/2011 | Cok et al. | |
| 2012/0293826 A1* | 11/2012 | Saurabh | 358/1.15 |

OTHER PUBLICATIONS

B. Pellow, "Moving to the Cloud", Business Development Services Analysis, Nov. 2010, InfoTrends 2010, pp. 1-7.
A. Wawro, "Cloud Printers Rain on Security Parade", PC World, Apr. 2011, vol. 29, No. 4, p. 36.

* cited by examiner

*Primary Examiner* — Benny Q Tieu
*Assistant Examiner* — Juan M Guillermety
(74) *Attorney, Agent, or Firm* — Fox Rothschild LLP

(57) ABSTRACT

A cloud administration system may include a processing module in communication with a plurality of print devices. The processing module may be located remotely from each of the plurality of print devices. The cloud administration system may include a storage module in communication with the processing module. The processing module may be configured to receive print device information from at least one of the plurality of print devices, store the print device information in the storage module, and enable an application computing device to access the print device information from the storage module. The application computing device may be located remotely from the processing module. The cloud administration system may operate as a shared resource for each of the plurality of print devices and the application computing device.

10 Claims, 7 Drawing Sheets

METHOD AND SYSTEM FOR MANAGING PRINT DEVICE INFORMATION USING A CLOUD ADMINISTRATION SYSTEM

CROSS-REFERENCE TO RELATED APPLICATIONS

This application is related to United States Patent or United States Patent Application Publication Numbers 2012/0293827 entitled "Method And System For Managing Print Jobs Using A Cloud Administration System", U.S. Pat. No. 8,505,004 entitled "Methods And Systems For Providing Software Updates Using A Cloud Administration System", U.S. Pat. No. 8,537,398 entitled "Methods And Systems For Tracking And Managing Print Device Inventory Information Using A Cloud Administration System", 2012/0293830 entitled "Method And System For Managing Print Device Information Using A Cloud Administration System", and 2012/0293831 entitled "Methods And Systems For Managing Print Device Licenses Using A Cloud Administration System", each filed on May 20, 2011.

BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system may include a processing module in communication with a plurality of print devices. The processing module may be located remotely from each of the plurality of print devices. The cloud administration system may include a storage module in communication with the processing module. The processing module may be configured to receive print device information from at least one of the plurality of print devices, store the print device information in the storage module, and enable an application computing device to access the print device information from the storage module. The application computing device may be located remotely from the processing module. The cloud administration system may operate as a shared resource for each of the plurality of print devices and the application computing device.

In an embodiment, a method of managing print device information may include receiving, by a cloud administration system, print device information from a print device located remotely from the cloud administration system, storing the received print device information in a computer-readable storage medium associated with the cloud administration system, and enabling an application computing device to access the print device information from the computer-readable storage medium. The application computing device may be located remotely from the cloud administration system.

DETAILED DESCRIPTION

Figure 1A:
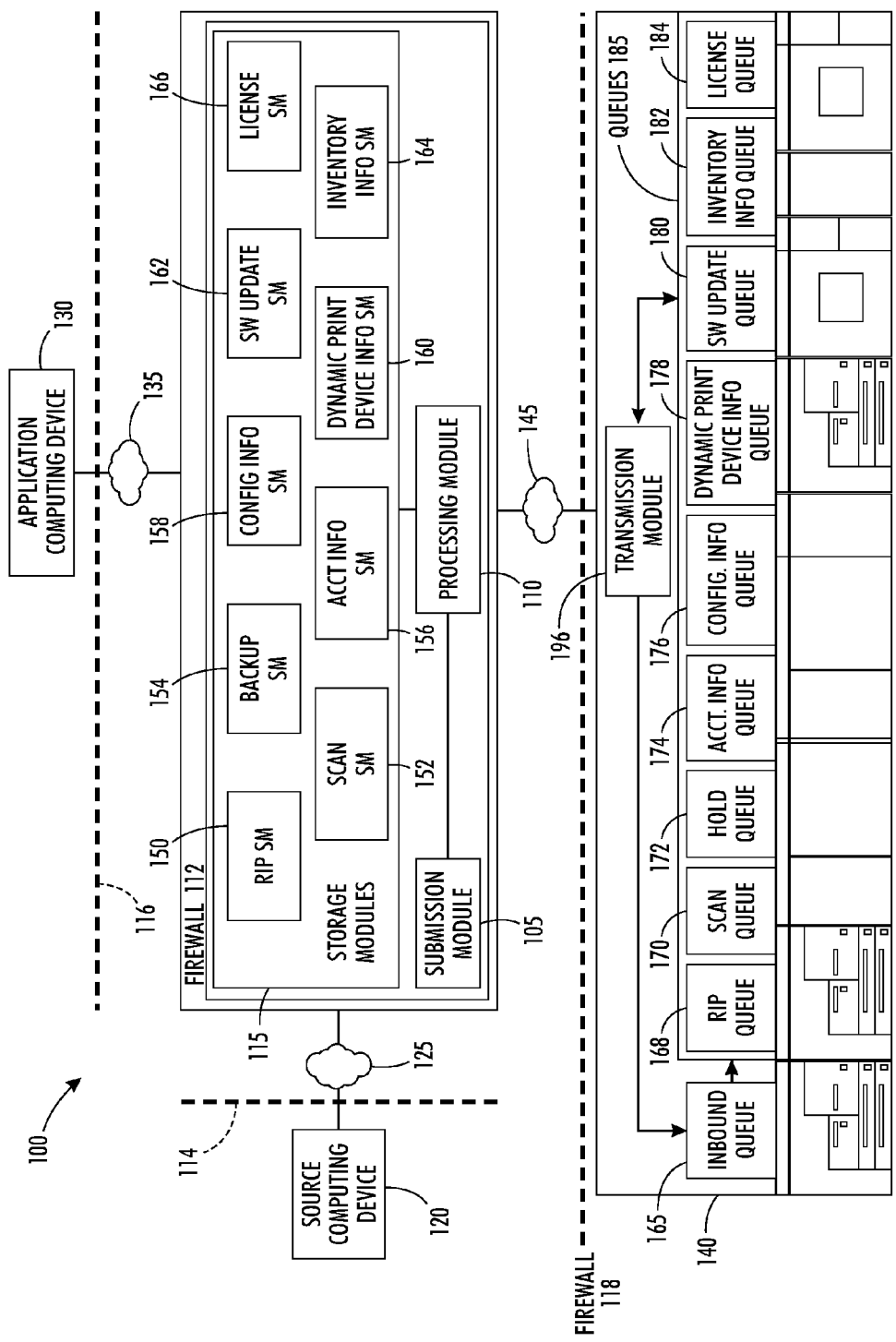
FIGS. 1A and 1B illustrate exemplary cloud administration systems according to an embodiment.

The following terms shall have, for the purposes of this application, the respective meanings set forth below.

"Accounting information" is information relating to the cost of processing one or more print jobs or performing other services by an associated print device. Exemplary accounting information may include a number of impressions, a number of monochrome impressions, a number of color impressions, a price per impression and/or the like.

An "application computing device" is a computing device capable of sending information to and/or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like. An exemplary computing device or processor is described in reference to FIG. 6.

"Configuration information" is a defined set of information relating to the configuration of a print device. Exemplary configuration information may include information associated with: one or more print trays of a print device, a memory of the print device, error logs of the print device, settings of the print device, properties of the print device and/or the like.

"Dynamic print device information" is information relating to the configuration and/or operation of a print device that is not configuration information. Exemplary dynamic print device information may include registry values, service statuses, process statuses and/or the like.

A "firewall" is hardware and/or software used to protect a resource of a network from unauthorized external access.

A "job" refers to a logical unit of work that is to be completed for a customer.

A "logical device" is a representation of a physical device that uniquely identifies the corresponding physical device. For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or a "print-related function" is a function that is performed on a print job. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a print device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

"Print device information" means accounting information, configuration information and/or dynamic print device information associated with a print device.

A "queue" is a data structure stored on a computer-readable medium and configured to temporarily store information, including, but not limited to, a print job, print device information and/or the like.

The term "remote," as used herein with respect to computing devices and/or print devices, refers to devices that operate on different computer networks and/or computer networks operated by different entities. For example, a computing device is remote from a print device if the computing device is connected to a first LAN operated by a first entity and the print device is connected to a second LAN operated by a second entity.

A "resource" is a physical device comprising a processor and/or a storage medium. Exemplary resources may include a computing device, a processing device, a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
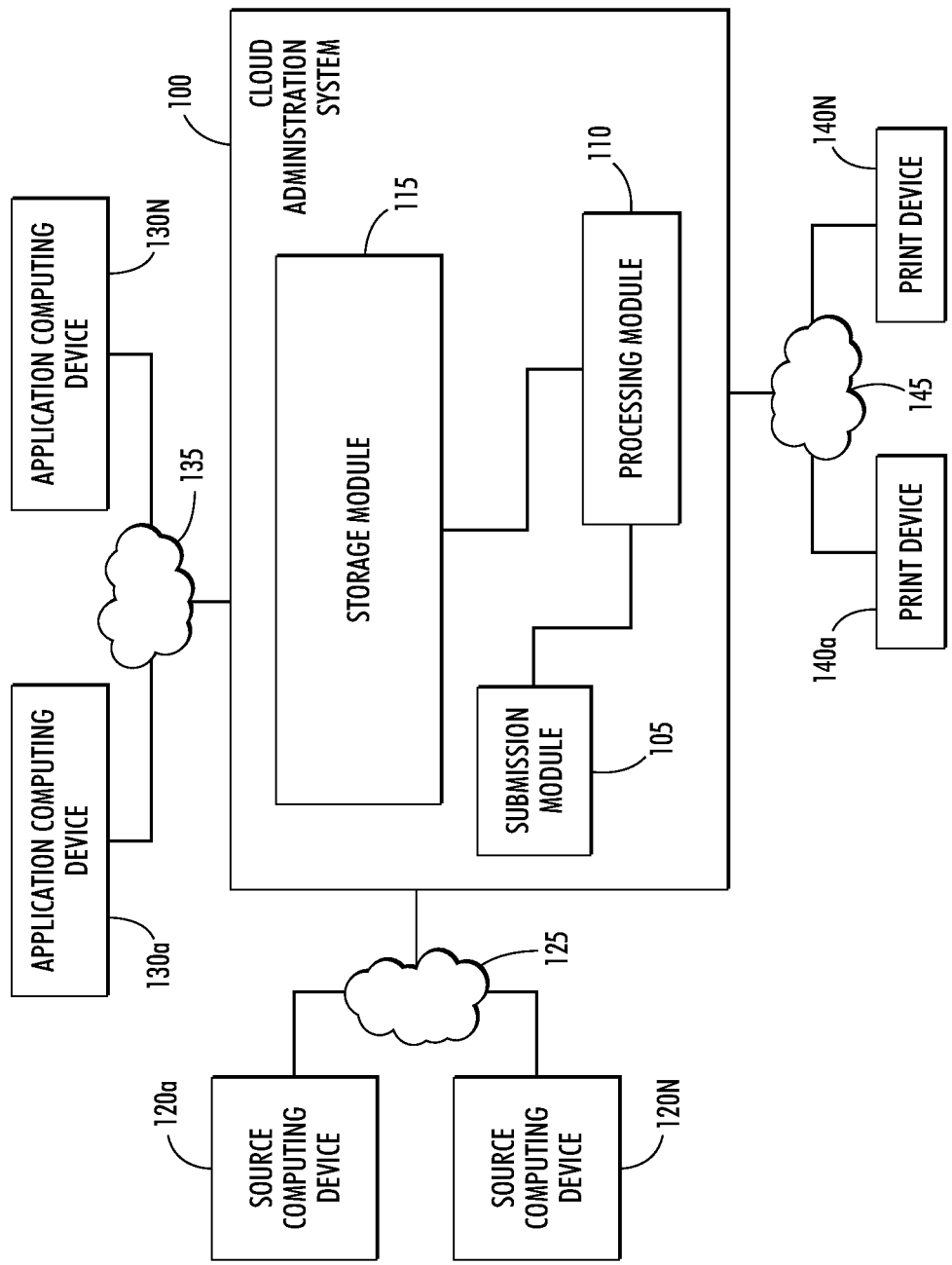

FIG. 1B depicts an exemplary cloud administration system according to an embodiment. As illustrated by FIG. 1B, a cloud administration system 100 may communicate with more than one source computing device 120a-N, application computing device 130a-N and/or print device 140a-N.

Figure 2:
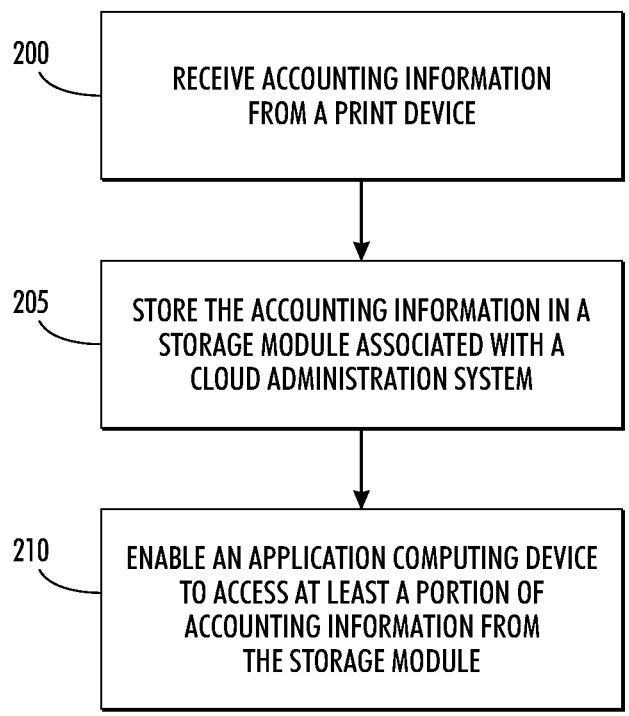
FIG. 2 illustrates an exemplary method of managing accounting information according to an embodiment.

FIG. 2 illustrates an exemplary method of managing accounting information according to an embodiment. As illustrated by FIG. 2, accounting information may be received 200 by the cloud administration system from one or more print devices in communication with the cloud administration system. In an embodiment, accounting information may be received 200 from one or more print device queues. In an embodiment, the print device queue from which the accounting information is received 200 may be dedicated to storing accounting information associated with the print device. For example, accounting information may be received from an accounting information queue, such as the accounting information queue 174 illustrated in FIG. 1A. In an embodiment, accounting information may be received from a transmission module associated with a print device.

In an embodiment, the received accounting information may be associated with a client of a print device vendor or service provider. For example, a corporate client of a print service provider may operate a print device at the corporation's place of business. Accounting information received 200 from the print device may be associated with the client's use and operation of the print device.

In an embodiment, accounting information may include a number of total impressions processed by a print device over a period of time, a number of monochrome impressions processed by a print device over a period of time, a number of color impressions processed by a print device over a period of time, a color price per impression, a monochrome price per impression, a number of print-related functions performed by a print device over a period of time, and/or a cost associated with one or more print-related functions.

In an embodiment, print-related functions may include stapling, collating, sorting, punching, binding and/or the like. In an embodiment, each print-related function may be associated with a price. In an embodiment, a price associated with a print-related function may be based on a number of pages on which the print-related function is performed. For example, stapling two to thirty pages may cost one price, while stapling documents having more than thirty pages may cost a different price.

In an embodiment, price information may be pre-programmed in a print device. In an embodiment, price information may be received by a print device from a computing device in communication with the print device. For example, a print device may be pre-programmed with then-current price information. If the price information is updated at a later time, the updated price information may be sent to and stored on the print device.

In an embodiment, accounting information may be received 200 from a print device periodically or intermittently. For example, accounting information may be received 200 from a print device at regular intervals, such as daily. In an alternative embodiment, accounting information may be received 200 from a print device in response to the print device receiving a request for accounting information from a cloud administration system or other computing device in communication with the print device.

In an embodiment, accounting information may be received 200 by a processing module of a cloud administration system. The processing module may store 205 the received accounting information in a storage module associated with the cloud administration system. For example, the cloud administration system may have one or more storage modules that are dedicated to storing accounting information. For example, a cloud administration system may have an accounting information storage module such as the accounting information storage module 156 illustrated in FIG. 1A. Accounting information that is received from a print device may be stored 205 in one or more of these dedicated storage modules. In an embodiment, the storage module of the cloud administration system in which the accounting information is stored 205 may be associated with the print device queue of the print device from which the accounting information was received 200.

In an embodiment, received accounting information may be stored 205 along with an indicator of its source. For example, an identifier associated with the print device from which the accounting information was received, such as a print device name, serial number and/or the like may be stored with the information. In an embodiment, a customer or entity associated with the print device from which the accounting information was received may be stored with the accounting information.

In an embodiment, the cloud administration system may enable 210 an application computing device to access at least a portion of the accounting information from a storage module. In an embodiment, an application computing device may access accounting information from a storage module in order to process the accounting information. For example, an application computing device may access accounting information from a storage module to import the accounting information into a billing or other type of software application. In an alternate embodiment, an application computing device may access a print job from a storage module in order to copy the accounting information, initiate transmission of the accounting information and/or otherwise utilize the accounting information and/or metadata associated with the accounting information.

For example, accounting information may be received from each print device operated by a customer. This accounting information may be stored in an accounting storage module of a cloud administration system. An application computing device may access the accounting storage module to import the accounting information into a billing software application managed by the entity that operates the application computing device. The entity may use the accounting information to generate a bill for the customer.

Figure 3:
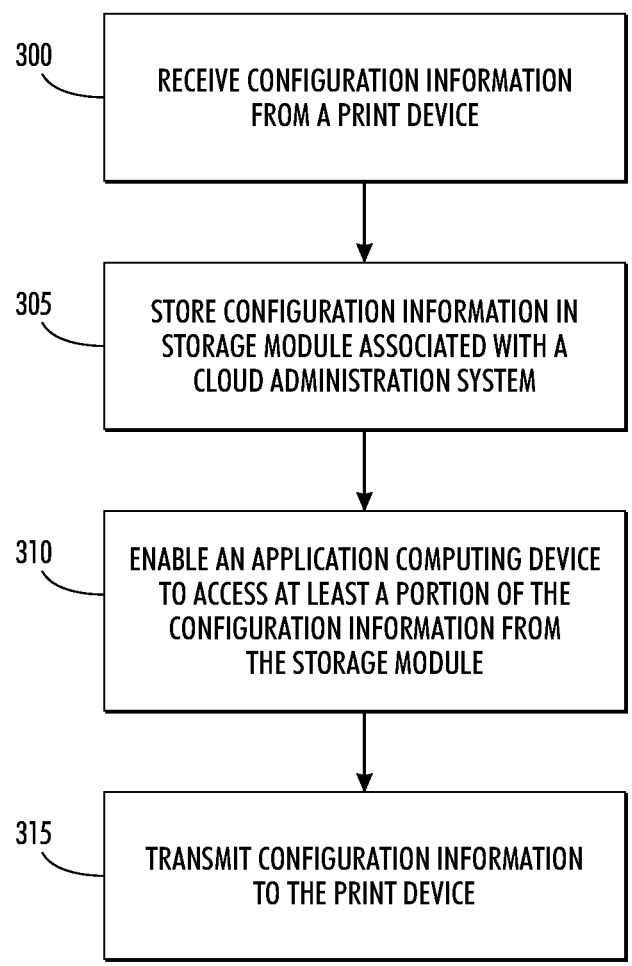
FIG. 3 illustrates an exemplary method of managing configuration information according to an embodiment.

FIG. 3 illustrates an exemplary method of managing configuration information according to an embodiment. As illustrated by FIG. 3, configuration information may be received 300 by the cloud administration system from one or more print devices in communication with the cloud administration system. In an embodiment, configuration information may be received 300 from one or more print device queues. In an embodiment, the print device queue from which the configuration information is received 300 may be dedicated to storing configuration information associated with the print device. For example, configuration information may be received from a configuration information queue such as the configuration information queue 158 shown in FIG. 1A. In an embodiment, configuration information may be received from a transmission module associated with a print device.

In an embodiment, configuration information may include information associated with one or more print trays of a print device, information associated with a memory of a print device, information associated with one or more error logs of a print device, information associated with one or more settings of a print device, information associated with one or more properties of a print device, a printer name associated with a print device, a printer uniform resource identifier associated with a print device, a location associated with a print device, a model associated with a print device and/or the like.

In an embodiment, configuration information may be received 300 from a print device periodically or intermittently. For example, configuration information may be received 300 from a print device at regular intervals, such as daily. In an alternative embodiment, configuration information may be received 300 from a print device in response to the print device receiving a request for configuration information from a cloud administration system or other computing device in communication with the print device. In an embodiment, configuration information may be received 300 from a print device in response to a user initiating transfer of the configuration information via an interface of the print device.

In an embodiment, configuration information may be received 300 by a processing module of a cloud administration system. The processing module may store 305 the received configuration information in a storage module associated with the cloud administration system. For example, the cloud administration system may have one or more storage modules that are dedicated to storing configuration information. For example, a cloud administration system may have a configuration information storage module, such as the configuration storage module 158 illustrated in FIG. 1A. Configuration information that is received from a print device may be stored 305 in one or more of these dedicated storage modules. In an embodiment, the storage module of the cloud administration system in which the configuration information is stored 305 may be associated with the print device queue of the print device from which the configuration information was received 300.

In an embodiment, received configuration information may be stored 305 along with an indicator of its source. For example, an identifier associated with the print device from which the account information was received, such as a print device name, serial number and/or the like may be stored with the configuration information. In an embodiment, a customer or entity associated with the print device from which the account information was received may be stored with the configuration information.

In an embodiment, the cloud administration system may enable 310 an application computing device to access at least a portion of configuration information from a storage module. In an embodiment, an application computing device may access configuration information to utilize the configuration by a software application or other program. In an embodiment, an application computing device may access a print job from a storage module in order to copy the configuration information, initiate transmission of the configuration information and/or otherwise utilize the configuration information and/or metadata associated with the configuration information.

In an embodiment, the configuration information may be accessed by an application computing device to backup the configuration information. For example, an application computing device may copy the configuration information from one or more storage modules of a cloud administration system, and may store the copied configuration information in a computer-readable storage medium associated with the application computing device or other computer-readable storage medium.

In an embodiment, configuration information may be transmitted 315 to a print device from a cloud administration system. For example, configuration information may be transmitted 315 to a print device if the configuration information stored on the print device is corrupted or otherwise becomes inaccessible or unavailable. In an embodiment, configuration information may be received by a cloud administration system from an application computing device and then transmitted 315 from the cloud administration system to the print device. In an alternate embodiment, configuration information may be retrieved from a storage module associated with the cloud administration system and transmitted 315 to the print device to which the configuration information corresponds.

Figure 4:
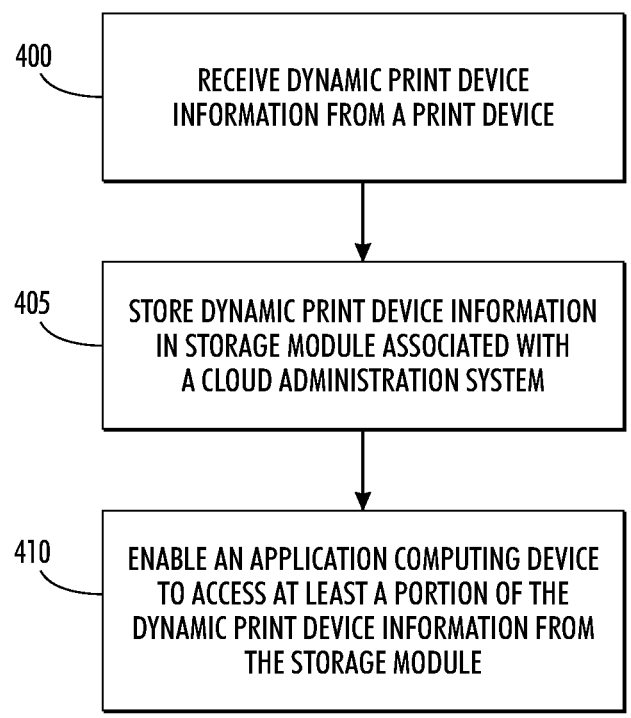
FIG. 4 illustrates an exemplary method of managing dynamic print device information according to an embodiment.

FIG. 4 illustrates an exemplary method of managing dynamic print device information according to an embodiment. As illustrated by FIG. 4, dynamic print device information may be received 400 by the cloud administration system from one or more print devices in communication with the cloud administration system. In an embodiment, dynamic print device information may be received 400 from one or more print device queues. In an embodiment, the print device queue from which the dynamic print device information is received 400 may be dedicated to storing dynamic print device information associated with the print device. For example, dynamic print device information may be received from a dynamic print device information queue, such as the dynamic print device information queue 160 shown in FIG. 1A. In an embodiment, dynamic print device information may be received from a transmission module associated with a print device.

In an embodiment, dynamic print device information may include information associated with a print device that is not configuration information. Exemplary dynamic print device information may include a registry value, file version information, an indication of whether an expression exists inside a file, an indication of whether a string exists inside of a file, an indication of whether a file exists, an indication of whether a file path exists, a service status, a process status and/or the like.

In an embodiment, dynamic print device information may be received 400 from a print device periodically or intermittently. For example, dynamic print device information may be received 400 from a print device at regular intervals, such as daily. In an alternative embodiment, dynamic print device information may be received 400 from a print device in response to the print device receiving a request for dynamic print device information from a cloud administration system or other computing device in communication with the print device.

In an embodiment, dynamic print device information may be received 400 by a processing module of a cloud administration system. The processing module may store 405 the received dynamic print device information in a storage module associated with the cloud administration system. For example, the cloud administration system may have one or more storage modules that are dedicated to storing dynamic print device information. For example, a cloud administration system may have a dynamic print device information storage module, such as the dynamic print device information storage module 160 illustrated in FIG. 1A. Dynamic print device information that is received from a print device may be stored 405 in one or more of these dedicated storage modules. In an embodiment, the storage module of the cloud administration system in which the dynamic print device information is stored 405 may be associated with the print device queue of the print device from which the dynamic print device information was received 400.

In an embodiment, received dynamic print device information may be stored 405 along with an indicator of its source. For example, an identifier associated with the print device from which the dynamic print device information was received, such as a print device name, serial number and/or the like may be stored with the dynamic print device information. In an embodiment, a customer or entity associated with the print device from which the account information was received may be stored with the dynamic print device information.

In an embodiment, the cloud administration system may enable 410 an application computing device to access at least a portion of dynamic print device information from a storage module. In an embodiment, an application computing device may access dynamic print device information to utilize the dynamic print device information by a software application or other program. In an embodiment, an application computing device may access a print job from a storage module in order to copy the dynamic print device information, initiate transmission of the dynamic print device information and/or otherwise utilize the dynamic print device information and/or metadata associated with the dynamic print device information.

Figure 5:
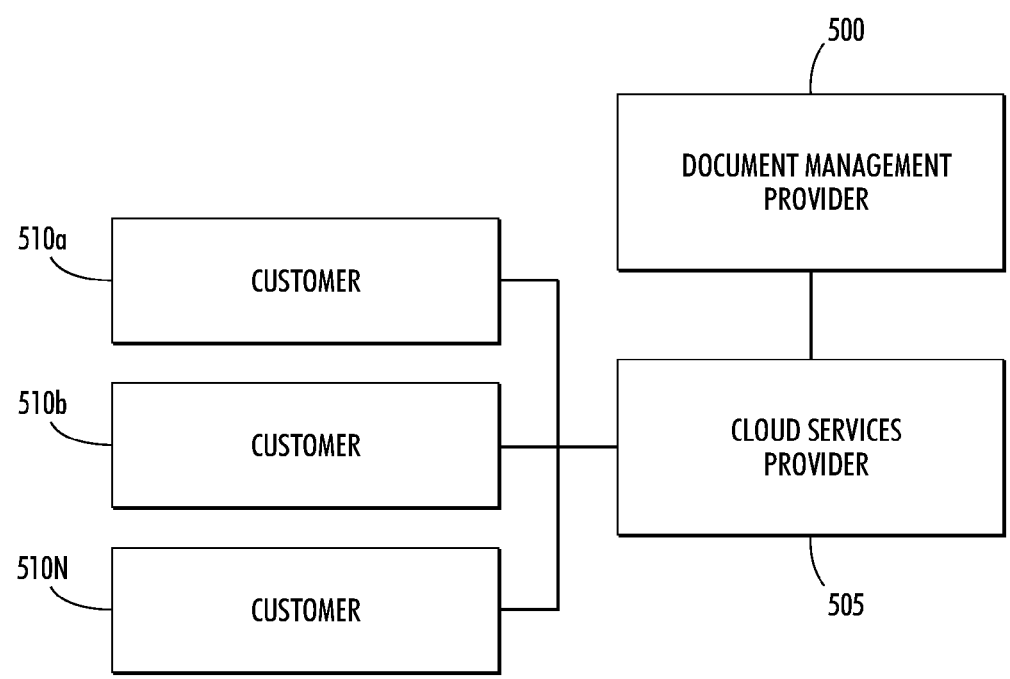
FIG. 5 illustrates an exemplary implementation of a cloud administration system according to an embodiment.

FIG. 5 illustrates an exemplary implementation of a cloud administration system according to an embodiment. A document management provider 500 may contract with a cloud services provider 505 to provide cloud services to the document management provider's customers 510*a*-N. A document management provider 500 may be an entity that supplies, manages and/or maintains print devices, processes print jobs and/or performs other document management services. A cloud services provider 505 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, and/or the like.

In an embodiment, a computing device operated by a customer 510*a*-N may communicate directly with a cloud administration system. For example, a print device utilized by a customer 510*a*-N at the customer's location may send print device information to a cloud administration system operated by a cloud services provider 505. The cloud administration system may store the print device information. In an embodiment, an application computing device operated by the document management provider 500 or another entity with whom the document management provider has contracted, may access print device information from the cloud administration system.

For example, a cloud administration system may store accounting information associated with print devices operated by a customer 510*a*-N. The document management provider 500 may access the accounting information via an application computing device from the cloud administration system in order to generate a bill for the customer 510*a*-N. For example, the document provider 500 may export the accounting information to a billing application. In an alternate embodiment, a billing service or other account management service with whom the document management provider 500 contracts for customer billing, may access the accounting information via an application computing device from the cloud administration system in order to generate a bill for the customer 510*a*-N.

As another example, a cloud administration system may store configuration information associated with a print device operated by a customer 510*a*-N. In an embodiment, an document provider 500 may access configuration information via an application computing device from the cloud administration system. In an embodiment, the configuration information may be sent back to the print device from the cloud administration system if the configuration information that is stored on the print device becomes corrupted or otherwise inaccessible.

As another example, a cloud administration system may store dynamic print device information associated with a print device operated by a customer 510*a*-N. The document management provider 500 may access dynamic print device information via an application computing device from the cloud administration system in order to monitor a print job's progress, a print device's performance and/or the like.

Figure 6:
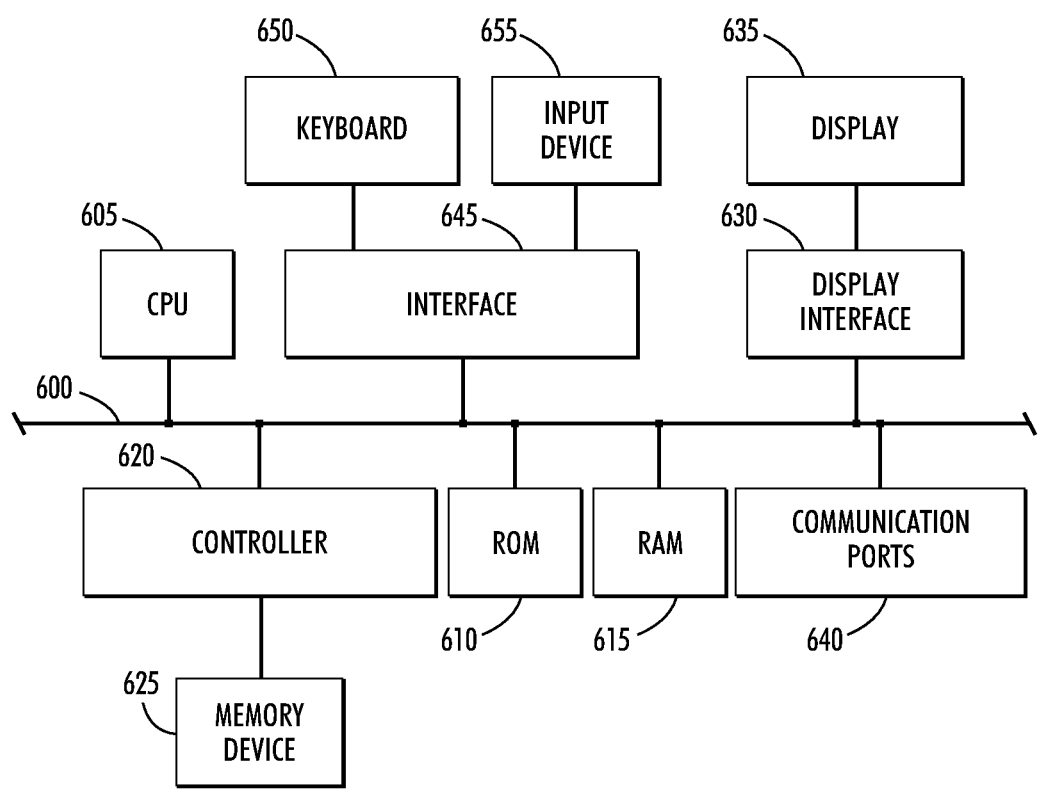
FIG. 6 depicts a block diagram of exemplary internal hardware that may be used to contain or implement program instructions according to an embodiment.

FIG. 6 depicts a block diagram of exemplary internal hardware that may be used to contain or implement program instructions, such as the process steps discussed above in reference to FIGS. 2, 3 and 4, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices or processor-readable storage media.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 630 may permit information from the bus 600 to be displayed on the display 635 in audio, visual, graphic or alphanumeric format. Communication with external devices, such as a print device, may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cloud administration system comprising:
a processing module in communication with a plurality of print devices, wherein the processing module is located remotely from each of the plurality of print devices;
an accounting information storage module in communication with the processing module;
a configuration information storage module in communication with the processing module; and
a dynamic print device information storage module in communication with the processing module,
wherein the processing module is configured to:
receive accounting information from a first queue of at least one of the plurality of print devices, wherein each first queue is dedicated to storing only accounting information,
store the accounting information in the accounting information storage module,
enable a first application computing device to access the accounting information from the accounting information storage module,
receive configuration information from a second queue of at least one of the plurality of print devices, wherein each second queue is dedicated to storing only configuration information,
store the configuration information in the configuration information storage module,
enable a second application computing device to access configuration information from the configuration information storage module,
receive dynamic print device information from a third queue of at least one of the plurality of print devices, wherein each third queue is dedicated to storing only dynamic print device information,
store the dynamic print device information in the dynamic print device information storage module,
enable a third application computing device to access dynamic print device information from the dynamic print device information storage module,
wherein each of the first, second and third application computing devices is located remotely from the processing module, wherein the cloud administration system operates as a shared resource for each of the plurality of print devices and each of the first, second and third application computing devices.

2. The cloud administration system of claim 1, wherein the processing module is further configured to transmit the configuration information to the print device from which the configuration information was received.

3. A method of managing print device information, the method comprising:
receiving, by a cloud administration system, accounting information from a first queue of at least one of a plurality of print devices located remotely from the cloud administration system, wherein each first queue is dedicated to storing only accounting information;
storing the received accounting information in a first computer-readable storage medium associated with the cloud administration system, wherein the first computer-readable storage medium corresponds to the first queue of the print device from which it is received;
enabling a first application computing device to access the accounting information from the first computer-readable storage medium, receiving configuration information from a second queue of at least one of the plurality of print devices, wherein each second queue is dedicated to storing only configuration information, storing the configuration information in a second computer-readable storage medium associated with the cloud administration system, wherein the second computer-readable storage medium corresponds to the second queue of the print device from which it is received, enabling a second application computing device to access configuration information from the second computer-readable storage medium, receiving dynamic print device information from a third queue of at least one of the plurality of print devices, wherein each third queue is dedicated to storing only dynamic print device information, storing the dynamic print device information in a third computer-readable storage medium associated with the cloud administration system, wherein the third computer-readable storage medium corresponds to the print device from which it is received, enabling a third application computing device to access dynamic print device information from the third application computing device, wherein the first, second and third application computing devices are each located remotely from the cloud administration system.

4. The method of claim 3, wherein:

receiving accounting information comprises periodically receiving accounting information from the at least one of the plurality of print devices, receiving configuration information comprises periodically receiving configuration information from the at least one of the plurality of print devices, receiving dynamic print device information comprises periodically receiving dynamic print device information from the at least one of the plurality of print devices.

5. The method of claim 3, further comprising transmitting at least a portion of the configuration information to the print device from which it was received.

6. The method of claim 5, wherein transmitting at least a portion of the configuration information to the print device comprises transmitting at least a portion of the configuration information to the print device in response to configuration information stored on the print device being inaccessible.

7. The method of claim 3, further comprising:

receiving at least a portion of the configuration information from the second application computing device; and transmitting the at least a portion of the configuration information to at least one of the print devices in the plurality of print devices.

8. The method of claim 3, wherein receiving accounting information comprises receiving one or more of the following:

a number of total impressions processed by the print device over a period of time;

a number of monochrome impressions processed by the print device over the period of time;

a number of color impressions processed by the print device over the period of time;

a color price per impression;

a monochrome price per impression;

a number of print-related functions performed by the print device over the period of time; and a cost associated with one or more print-related functions.

9. The method of claim 3, wherein receiving configuration information comprises receiving one or more of the following:

information associated with one or more print trays of the print device;

information associated with a memory of the print device;

information associated with one or more error logs of the print device;

information associated with one or more settings of the print device;

information associated with one or more properties of the print device;

a printer name associated with the print device;

a printer uniform resource identifier associated with the print device;

a location associated with the print device; and a model associated with the print device.

10. The method of claim 3, wherein receiving dynamic print device information comprises receiving one or more of the following:

a registry value, file version information;

an indication of whether an expression exists within a file;

an indication of whether a string exists within a file;

an indication of whether a file exists;

an indication of whether a file path exists;

a service status; and a process status.

* * * * *